Feb. 6, 1923.
A. BARBEZIEUX.
STEADYING DEVICE FOR VEHICLES.
FILED JUNE 4, 1921.
1,444,022
3 SHEETS-SHEET 1
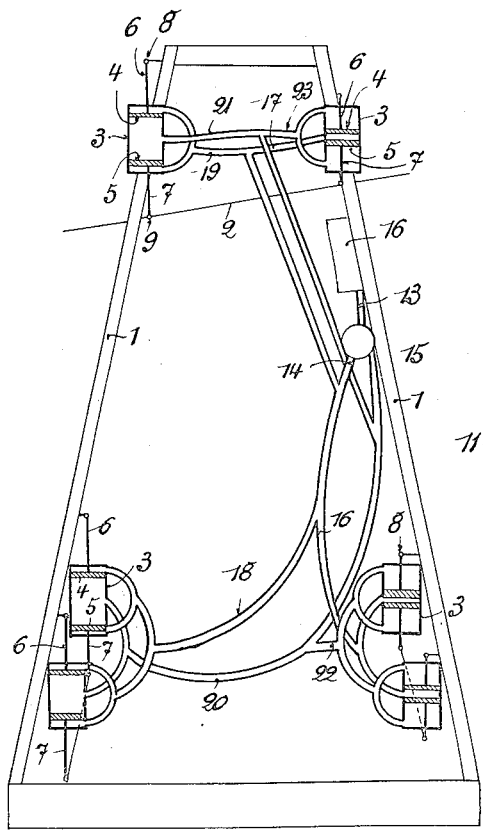
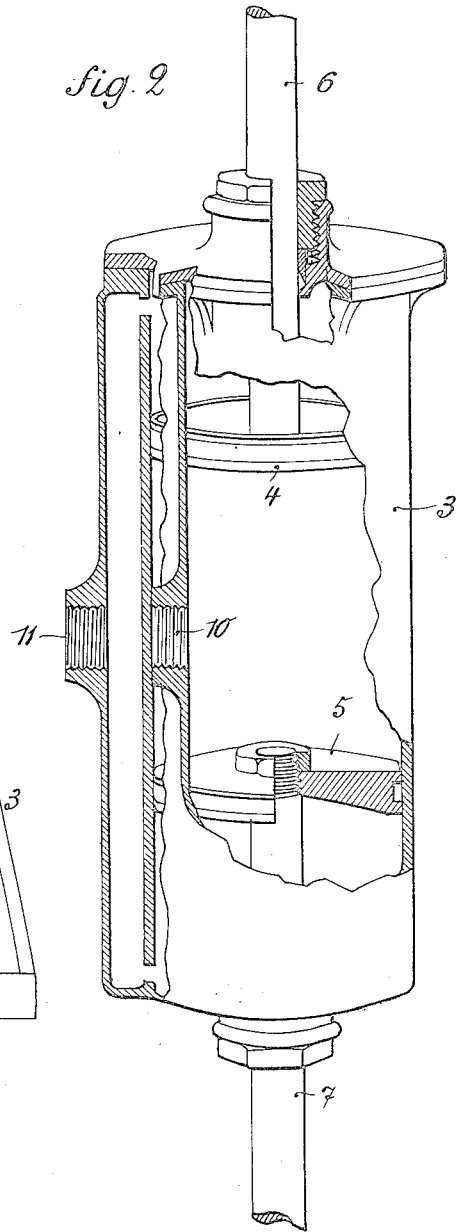
Inventor
A. Barbezieux,
By Marks & Clerk
Attys.

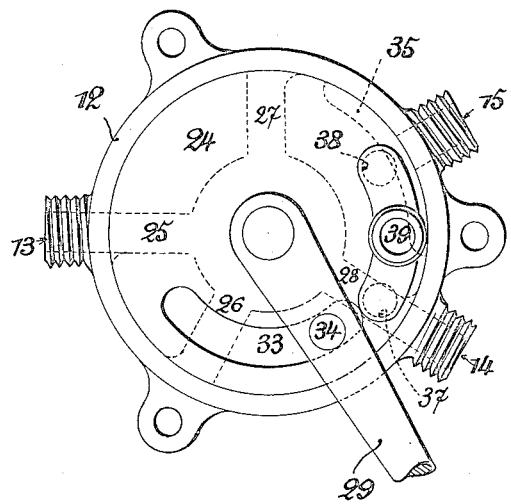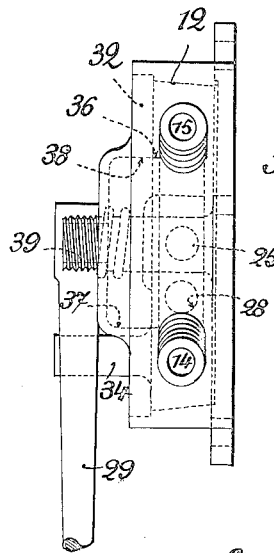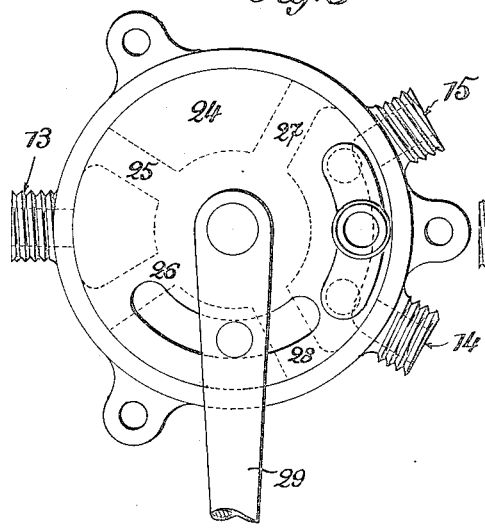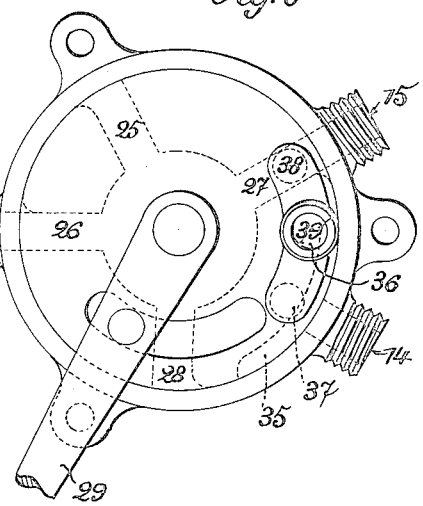

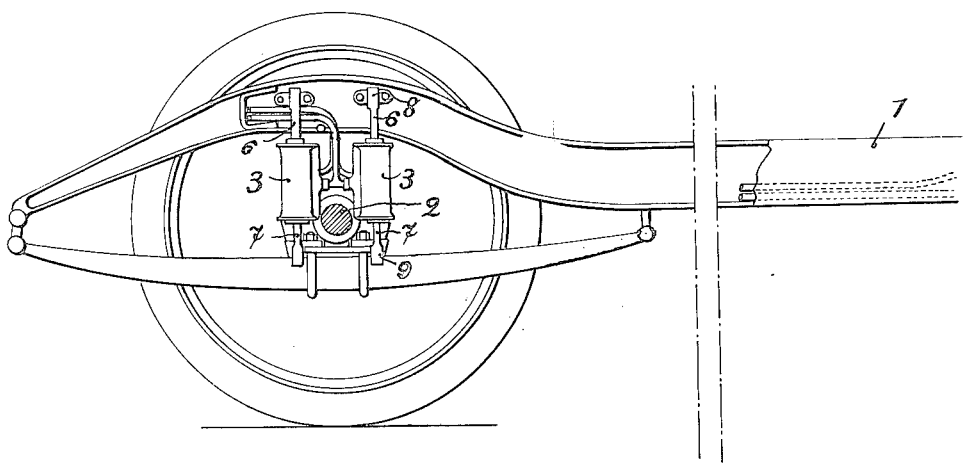
fig. 7
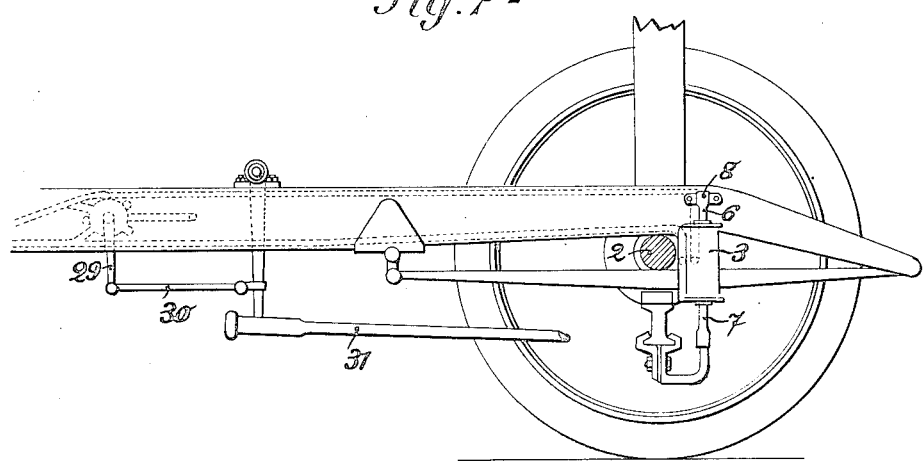
fig. 7ª

Patented Feb. 6, 1923.

1,444,022

UNITED STATES PATENT OFFICE.

ALBERT BARBEZIEUX, OF PARIS, FRANCE.

STEADYING DEVICE FOR VEHICLES.

Application filed June 4, 1921. Serial No. 475,164.

*To all whom it may concern:*

Be it known that I, ALBERT BARBEZIEUX, a citizen of the Republic of France, and residing at Paris, Seine Department, No. 3bis rue Coyswox, in the Republic of France, engineer, have invented certain new and useful Improvements in Steadying Devices for Vehicles, of which the following is a specification.

This invention relates to a device affording a steady running for vehicles when making turns upon the road and for preventing them from tipping. In fact, when the vehicle is travelling around a curve in the road, the body of the vehicle is subject to tipping on its springs by reason of the centrifugal force occasioned by the speed, whereby the centre of gravity of the vehicle is displaced towards the outer side of the curve and an unsteady running of the vehicle will ensue.

The device according to my invention has for its effect to ease the outer spring when going around curves and on the contrary to load the inner spring, thereby maintaining the vehicle body in the horizontal position or even inclined towards the outside of the curve. To this end it may be provided, for each wheel, with one or more cylinders each containing two pistons whose rods are respectively connected with the vehicle frame and the axle, as well as a fluid-control device actuated by the steering parts in such manner as to supply compressed air or like fluid under pressure either to one side of the vehicle and between the said pistons or on the outer side of each piston, or in the contrary sense, to the other side of the vehicle in such manner as to produce a like effect.

The accompanying drawings show by way of example a form of construction of the apparatus according to this invention.

Fig. 1 is a diagrammatic view of the entire installation.

Fig. 2 shows one of the steadying cylinders in perspective, with certain parts in section.

Fig. 3 is a front view of the fluid-control device in the neutral position.

Fig. 4 is a cross-section of the same.

Figs. 5 and 6 show the said fluid-control device in front view in the positions for passing around curves.

Between the vehicle frame 1 and the axles 2 are disposed the cylinders 3 in suitable number for performing the requisite work without being cumbersome. Each of the said cylinders is provided with two pistons 4, 5, the piston rods whereof are respectively connected by the socket joints 8 and 9 with the vehicle frame and axles. Compressed air is introduced between the pistons 4 and 5 through the orifice 10, a second orifice 11 being used on the contrary for admitting air at the same time to the opposite sides of the said pistons. By suitably regulating the distribution of compressed air, a pressure may thus be exerted between the axle and the vehicle frame, or on the contrary a traction tending to draw them together.

This adjustment is automatically obtained by the device shown in Fig. 5. This device comprises a main cylinder 12 provided with three necks 13, 14 and 15. The neck 15 is connected with a compressed air reservoir 16 supplied by any suitable compressor, this latter being driven automatically by the vehicle motor, for instance and is provided with a safety device for uncoupling the said compressor when required and subsequently coupling the same. The neck 14 (Fig. 1) is connected through the ducts 16, 17 with the space between the pistons of the cylinders situated on the right-hand side of the vehicle, and through the ducts 18 and 19 with the spaces outside the pistons of the cylinders disposed on the left-hand side. In like manner, the neck 15 is connected through the ducts 20 and 21 with the spaces between pistons of the left-hand set, and through the ducts 22 and 23 with the spaces outside the pistons of the right-hand set.

In the diagrammatic view, the steadying device is supposed to contain two cylinders at the rear of the vehicle and disposed at the sides, and a single cylinder at the front of the vehicle, the fluid passages being suitably branched to this effect, but any suitable number of cylinders may be used. Within the main body 12 is disposed the revoluble drum 24 having formed therein the ports 25, 26, 27 and 28. These latter are so disposed that in the position shown in Fig. 5, the compressed air passes through the ports 25 and 28 to the neck 14 and thence through the ducts 16, 17, 18, 19, thus tending to separate the right-hand pistons and to bring together the left-hand pistons, this being the position for making a left-hand turn on the road.

In like manner in the position shown in

Fig. 6, the air passes through the ports 26 and 27 to the neck 15 for the supply of the cylinders through 20, 21, 22, 23, whereby the right-hand pistons are brought together and the left-hand pistons separated, this being the position for a right-hand turn.

The drum 24 is controlled by an arm 29 connected by a link 30 to the steering rod 31 of the vehicle, and in this manner the supply of compressed air is automatically controlled in the proper manner by the sole action of steering the wheels. The main body 12 is closed by a cap 32 having therein an aperture serving to guide the stud 34 secured to the drum 24 and fitted into the arm 29. On the other hand, when changing over from a left-hand turn to a right-hand turn of the vehicle, it is required to discharge the compressed air contained in the cylinders in order to obviate back-pressures. To this effect the drum 12 is provided with an additional passage 35 formed at the periphery thereof and opening into a lateral duct 36, the cap 32 having therein the ducts 37 and 38 coming together at the orifice 39 connected with the outer air.

In the position corresponding to the travel of the vehicle in a straight line—(Fig. 3), the necks 14 and 15 are connected together by the passage 35, the duct 36 being opposite a solid portion of the said cap, and this position affords an equilibrium of pressure. In this case the apparatus will act as a shock-absorber with compensating effect for considerable movements of the vehicle to either side. Should the steering be changed, the said drum will take for instance the position shown in Fig. 5; whereby the neck 15 will be connected with the outer air through 35, 36, 38 and 39. On the contrary, as shown in Fig. 6, the neck 14 now serves for the discharge. The compressed air thus evacuated may be used in an acoustic horn which is connected with the orifice 39, in such manner that at each turn of the road the horn will be automatically actuated.

It is understood that a suitable device will be provided whereby the driver may prevent this latter operation, and he may even be enabled to prevent the action of the steadying device itself, for instance when within the city limits.

Aside from the safety which is afforded by the device according to this invention, it should be remarked that the comfort of the vehicle will be much increased from the absence of tipping when going around curves.

Claims:

1. The combination of a vehicle comprising a vehicle frame, a driving axle, a steering axle, steering mechanism connecting the said steering wheel with the steering axle, and suspension means connected with the steering axle and with the said frame, together with a steadying mechanism device comprising an extensible and compressible mechanism actuated by fluid under pressure and disposed between said axles and the said vehicle frame, a compressed air control device, and means connecting the said control device with the said steering mechanism, the compressed air control being so operated that when passing around a curve on the road the side of the vehicle frame adjacent the outside of the curve shall be raised and the side adjacent the inner side of the curve shall be lowered.

2. The combination of a vehicle comprising a vehicle frame, a driving axle, a steering axle, steering mechanism connected with the steering axle, and suspension means connecting the said axle with the said frame, together with a steadying mechanism comprising a compressed air control device, means connecting the said control device with the said steering mechanism, cylinders disposed at each side of the vehicle between the said axles and the said vehicle frame, two pistons contained within each of the said cylinders, one of the said pistons being connected with the said vehicle frame and the other with the said axle, an admission orifice at the central part of the said cylinder, an admission orifice at each end of the said cylinder, passages connecting each of the said orifices with the said fluid control device, the fluid under pressure being delivered between the said pistons for the purpose of raising the said vehicle frame and delivered on the outside of each of the said pistons for lowering the said frame.

3. The combination of a vehicle comprising a vehicle frame, a driving axle, a steering axle, steering mechanism connected with the steering axle, and suspension means connecting the said axles with the said frame, together with a steadying device comprising cylinders disposed on each side of the vehicle between the said axles and the said vehicle frame, two pistons contained within each of the said cylinders, one of the said pistons being connected with the said vehicle frame and the other with the said axle, an admission orifice at the central part of the said cylinder, an admission orifice at each end of the said cylinder, a fluid control receptacle provided with three necks, one of the said necks being adapted to admit the compressed air, another of the said necks connecting the control receptacle with the space between the said pistons of the cylinders situated on the right-hand side of the said vehicle and with the spaces outside the said pistons of the said cylinders situated on the left-hand side of the said vehicle, another of the said necks connecting the said control receptacle with the space between the said pistons of the cylinders situated on the left-hand side of the said vehicle and with the spaces outside the pistons of the said cylinders situated on the right-hand side of the said vehicle.

4. The combination of a vehicle comprising a vehicle frame, a driving axle, a steering axle, steering mechanism connected with the steering axle, and suspension means connecting the said axles with the said frame, together with a steadying mechanism comprising cylinders disposed on each side of the vehicle between the said axles and the said vehicle frame, two pistons contained within each of the said cylinders, one of the said pistons being connected with the said vehicle frame and the other with the said axle, an admission orifice at the central part of the said cylinder, an admission orifice at each end of the said cylinder, a fluid control receptacle provided with three necks, one of the said necks adapted to admit the compressed air, another of the said necks connecting the control receptacle with the space between the said pistons of the cylinders situated on the right-hand side of the said vehicle and with the spaces outside the said pistons of the said cylinders situated on the left-hand side of the said vehicle, another of the said necks connecting the said control receptacle with the space between the said pistons of the cylinders situated on the left-hand side of the said vehicle and with the spaces outside the pistons of the said cylinders situated on the right-hand side of the said vehicle, a fluid control drum disposed within the said fluid control receptacle a lever connecting the said drum with the said steering mechanism, passages provided in the said drum, the said passages being so disposed that the compressed air admitted through the first of the said necks connected with the said reservoir shall be conducted to the second or to the third of the said necks according to the direction assumed by the vehicle.

5. The combination of a vehicle comprising a vehicle frame, a driving axle, a steering axle, steering mechanism connected with the steering axle, and suspension means connecting the said axles with the vehicle frame, together with a steadying mechanism comprising an extensible and compressible device actuated by fluid under pressure and disposed between the said axles and the said chassis, a fluid control receptacle provided with three necks, one of the said necks being adapted to admit the compressed air, the other two of the said necks being connected with the said extensible and compressible device, a fluid control drum disposed within the said fluid control receptacle, passages provided in the said control drum for connecting the first of the said necks either with the second or with the third neck; a passage disposed at the periphery of the said drum, a transverse duct leading from the said passage, a cap disposed upon the said fluid-control receptacle, two passages formed in the said cap, a discharge orifice having the said passages opening therein, a device for effecting the discharge of the air from the said extensible and compressible device and for absorbing the shocks when the vehicle is traveling in a straight line.

In testimony, that I claim the foregoing as my invention I have signed my name in presence of a subscribing witness.

ALBERT BARBEZIEUX.

Witness:
MAURICE ROWE.